(12) United States Patent
Krishnamurthy et al.

(10) Patent No.: US 10,402,323 B2
(45) Date of Patent: Sep. 3, 2019

(54) ORGANIZING MEMORY TO OPTIMIZE MEMORY ACCESSES OF COMPRESSED DATA

(71) Applicant: NVIDIA CORPORATION, Santa Clara, CA (US)

(72) Inventors: Praveen Krishnamurthy, Apex, NC (US); Peter B. Holmquist, Cary, NC (US); Wishwesh Gandhi, Sunnyvale, CA (US); Timothy Purcell, Princeton, NJ (US); Karan Mehra, Cary, NC (US); Lacky Shah, Los Altos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 37 days.

(21) Appl. No.: 14/925,920

(22) Filed: Oct. 28, 2015

(65) Prior Publication Data

US 2017/0123977 A1 May 4, 2017

(51) Int. Cl.
*G06F 12/08* (2016.01)
*G06F 12/0802* (2016.01)
*G06F 3/06* (2006.01)

(52) U.S. Cl.
CPC .......... *G06F 12/0802* (2013.01); *G06F 3/064* (2013.01); *G06F 3/0608* (2013.01); *G06F 3/0673* (2013.01); *G06F 2212/608* (2013.01)

(58) Field of Classification Search
CPC combination set(s) only.
See application file for complete search history.

(56) References Cited

U.S. PATENT DOCUMENTS

| | | | |
|---|---|---|---|
| 2009/0110309 A1* | 4/2009 | Sakai | H04N 5/783 |
| | | | 382/233 |
| 2013/0179752 A1* | 7/2013 | Shim | G06F 11/1004 |
| | | | 714/773 |

* cited by examiner

*Primary Examiner* — Yong J Choe
(74) *Attorney, Agent, or Firm* — Artegis Law Group, LLP

(57) ABSTRACT

In one embodiment of the present invention a cache unit organizes data stored in an attached memory to optimize accesses to compressed data. In operation, the cache unit introduces a layer of indirection between a physical address associated with a memory access request and groups of blocks in the attached memory. The layer of indirection—virtual tiles—enables the cache unit to selectively store compressed data that would conventionally be stored in separate physical tiles included in a group of blocks in a single physical tile. Because the cache unit stores compressed data associated with multiple physical tiles in a single physical tile and, more specifically, in adjacent locations within the single physical tile, the cache unit coalesces the compressed data into contiguous blocks. Subsequently, upon performing a read operation, the cache unit may retrieve the compressed data conventionally associated with separate physical tiles in a single read operation.

20 Claims, 10 Drawing Sheets

ORGANIZING MEMORY TO OPTIMIZE MEMORY ACCESSES OF COMPRESSED DATA

BACKGROUND OF THE INVENTION

Field of the Invention

Embodiments of the present invention relate generally to computer processing and, more specifically, to techniques for organizing memory to optimize memory accesses of compressed data.

Description of the Related Art

Some processing systems implement one or more data compression techniques to increase the effective memory bandwidth to attached memory devices, thereby improving overall performance. In such implementations, the processing system is configured to store certain blocks of data within the attached memory in one or more compressed formats that reduce the number of bytes used to represent each block of original data. Consequently, at any given time, the attached memory may include any number of compressed blocks of data and any number of non-compressed blocks of data.

In processing systems configured to store compressed data, the processing system typically allocates the number of bytes required to store a non-compressed block of data each time a request to write a block of data to attached memory is processed. If the processing system ends up writing a given block of data in a compressed format, then the processing system simply stores the compressed data in a portion of the memory allocated for the non-compressed version of the block of data known as a "compression atom." Notably, each compression atom includes the number of bytes required to store the compressed version of the data block on the compression format implemented by the processing system.

In many processing systems, the number of bytes in the compression atom is configured to match the number of bytes that the processing system transmits to or from the attached memory as part of performing, respectively, a write or read operation. As referred to herein, a "memory atom" associated with the attached memory is the data that the processing system transmits to and from the attached memory. Consequently, each memory atom includes the number of bytes that the processing system transmits to or from the attached memory. Such a set-up allows the processing system to fully utilize the memory bandwidth between the processing system and the attached memory when performing compressed data accesses. For example, a processing system could support a 32 byte compression atom and a 32 byte dynamic random-access memory (DRAM) atom. To read a compressed block of data, the processing system would retrieve a 32 byte DRAM atom that includes 32 bytes of compressed data from the DRAM. Accordingly, in such a scenario, the memory bandwidth between the processing system and the DRAM is fully utilized, and the overall performance of the processing system is optimized.

By contrast, in some processing systems, the size of the compression atom may not match the size of the memory atom associated with an attached memory because the size of the compression atom and the size of the memory atom associated with an attached memory may each be individually optimized based on different technologies that evolved over different time frames. When the size of the compression atom and the size of the memory atom associated with an attached memory differ, the processing systems typically cannot fully utilize the available memory bandwidth when performing compressed data accesses, which decreases the overall performance of the processing system. For example, a processing system could support a 32 byte compression atom and a 64 byte DRAM atom. To read a compressed block of data from the attached memory, the processing system would retrieve a 64 byte DRAM atom that includes the 32 bytes of compressed data as well as 32 bytes of meaningless data. Accordingly, half of the memory bandwidth between the processing system and the attached memory is wasted.

As the foregoing illustrates, what is needed in the art is a more effective approach to managing accesses to compressed data in memory.

SUMMARY OF THE INVENTION

One embodiment of the present invention sets forth a system configured to process memory accesses associated with compressed data. The system includes a processor; and a cache memory coupled to the processor and configured to: receive a first memory access request from the processor to write first compressed data to a first physical address within another memory; in response, select a first group of blocks within the another memory based on the first physical address; determine that a first storage state associated with the first group of blocks indicates that a first physical tile included in the first group of blocks already stores second compressed data; and store the first compressed data adjacent to the second compressed data in the first physical tile.

Further embodiments provide, among other things, a computer-implemented method that implements one or more of the aspects of the techniques described herein as well as a computing device that includes different elements configured to implement one or more of the aspects of the techniques described herein.

One advantage of the disclosed techniques is that they enable systems to optimize the memory bandwidth between the processor unit and an attached memory during memory accesses of compressed data, thereby improving the performance of the system. More specifically, by coalescing useful compressed data, the cache memory may increase the amount of useful compressed data that may be transferred in a single read operation compared to a conventional cache memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
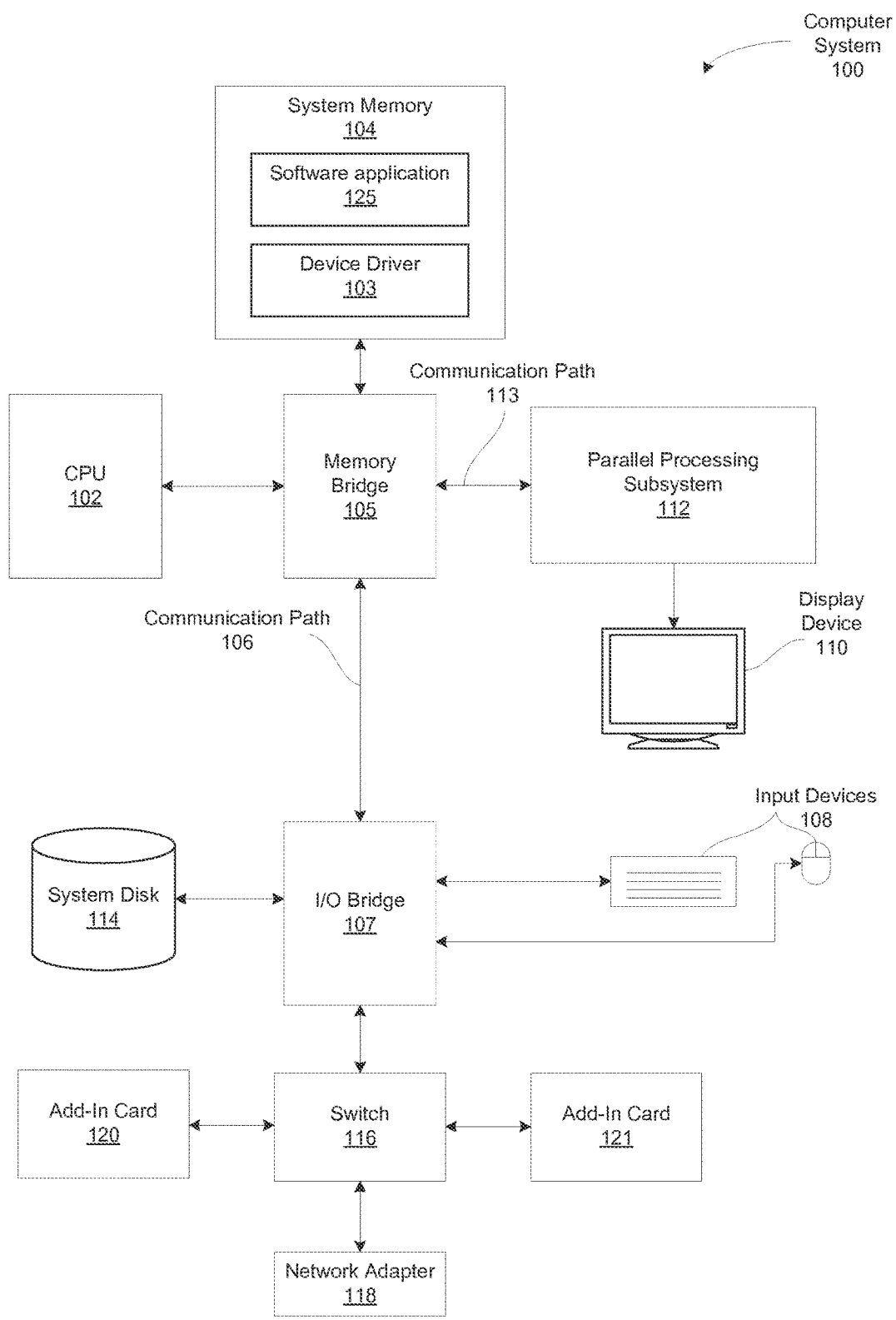
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
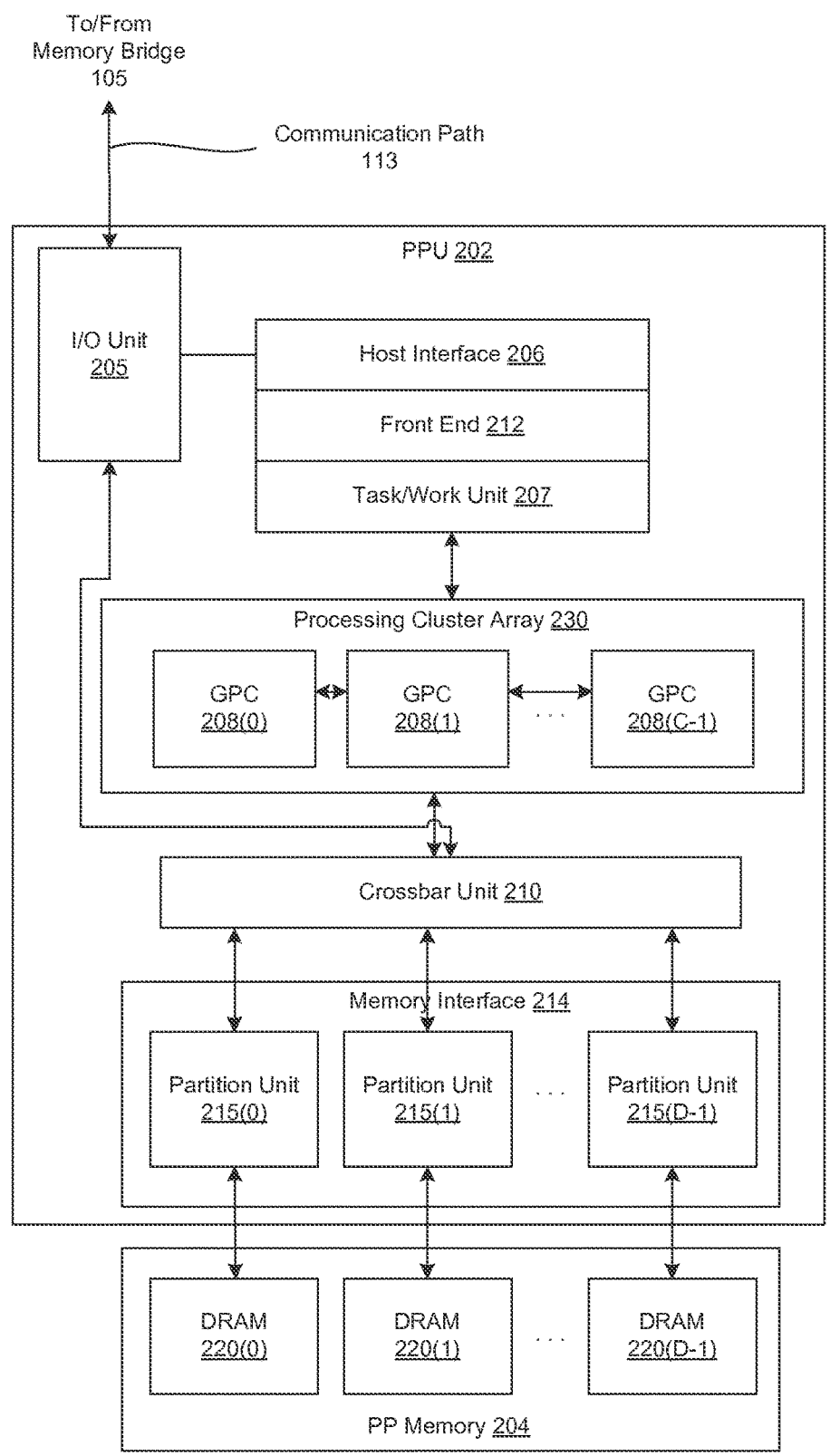
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available memory bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
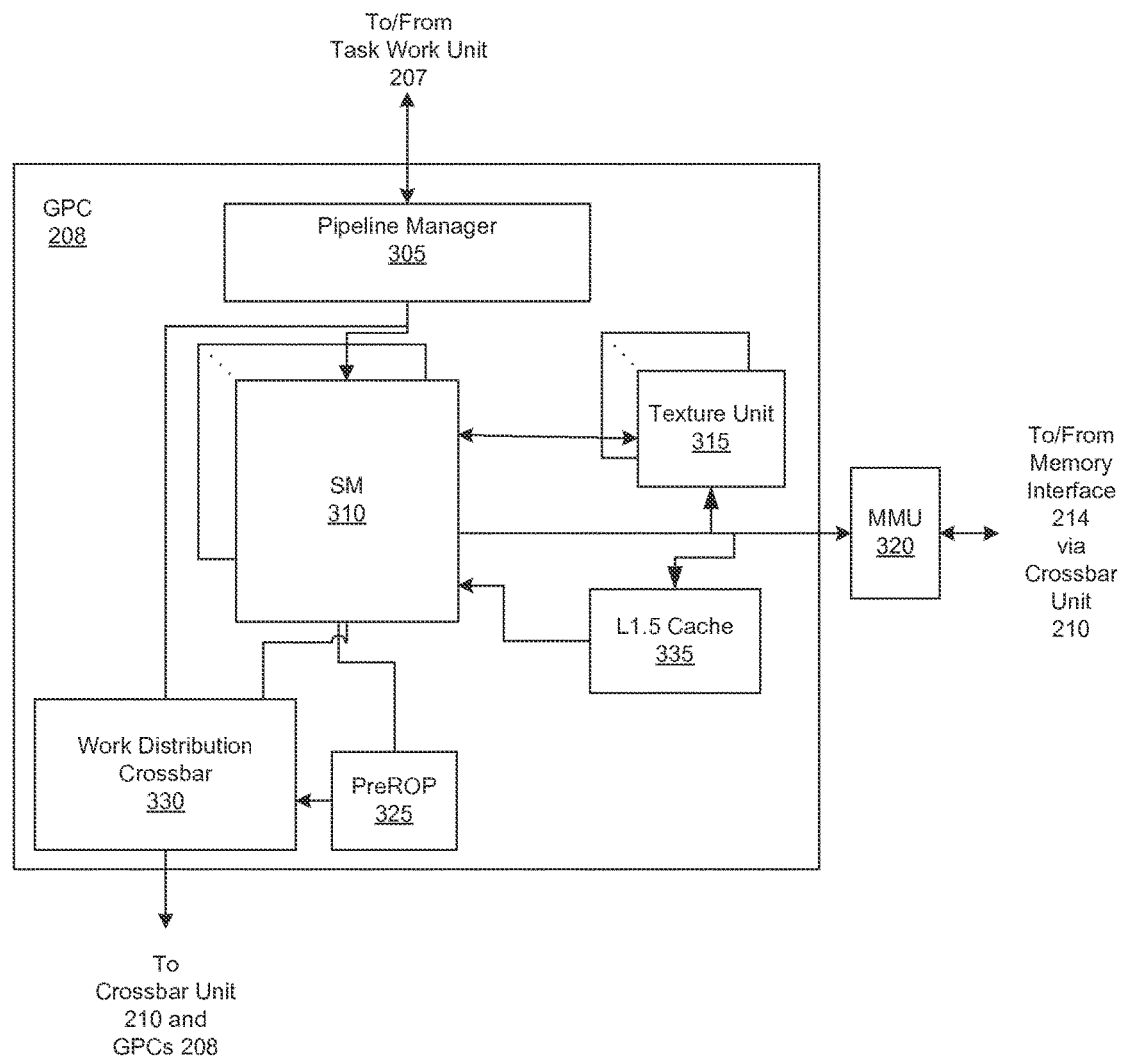
FIG. 3 is a block diagram of a general processing cluster included in the parallel processing unit of FIG. 2, according to various embodiments of the present invention.

FIG. 3 is a block diagram of a general processing cluster (GPC) 208 included in parallel processing unit (PPU) 202 of FIG. 2, according to various embodiments of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown in FIG. 3), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating-point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown in FIG. 3) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Figure 4:
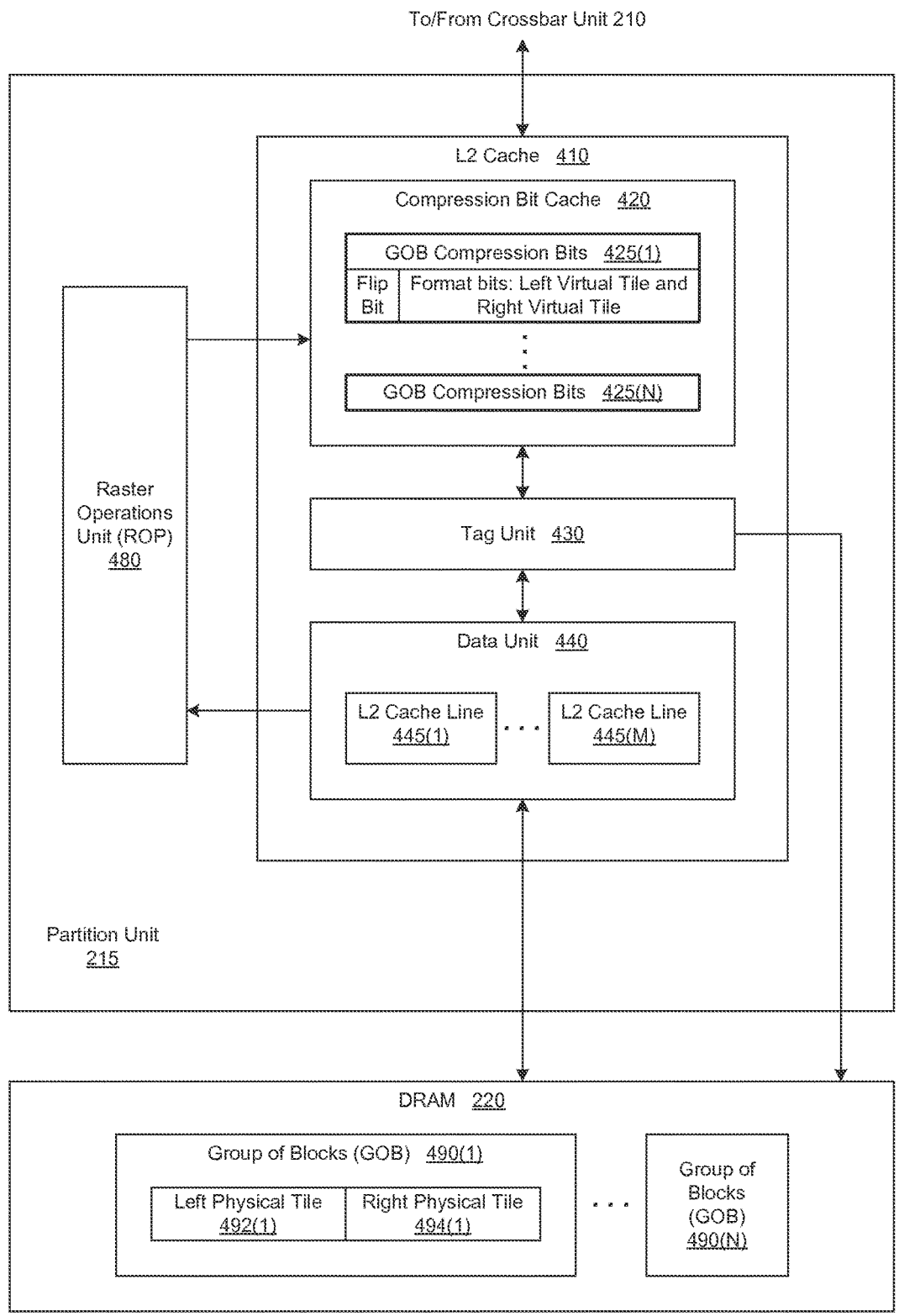
FIG. 4 is a more detailed block diagram of one of the partition units of FIG. 2, according to various embodiments of the present invention.

FIG. 4 is a more detailed block diagram of one of the partition units 215 of FIG. 2, according to various embodiments of the present invention. As shown, the partition unit 215 includes, without limitation, a raster operations unit (ROP) 480, and a level two (L2) cache 410.

The ROP 480 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 480 is configured to compress z or color data that is written to memory and decompress z or color data that is read from memory. In various embodiments, the ROP 480 may be located in the memory interface 214, in the GPCs 208, in the processing cluster array 230 outside of the GPCs, or in a separate unit within the PPUs 202.

The L2 cache 410 is a read/write cache that is configured to perform load and store operations received from the ROP 480 and the crossbar unit 210. As shown, the L2 cache 250 includes, without limitation, a compression bit cache (CBC) 420, a tag unit 430, and a data unit 440. In operation, the L2 cache 410 receives memory access requests from the ROP 480 and the crossbar unit 210. The memory access requests comprise read and write operations performed on blocks of memory that may be associated with a data surface. In alternate embodiments, the L2 cache 410 may receive memory access requests from any number of ROPs 480. In some embodiments, the ROP 480 may issue memory access requests to any number of partition units 215, each including an instance of the L2 cache 410.

In general, upon receiving a memory access request, the CBC 420 determines the compression status for the accessed block of memory. The tag unit 430 then processes the memory access request based on the type of memory access request, whether the accessed block of memory is stored in the data unit 440, and the compression status. In particular, if the memory access request is a read request, then the tag unit 430 determines whether the data associated with the accessed block of memory is currently residing within any number of level 2 (L2) cache lines 445 that are included in the data unit 440. If so, meaning that there is a "cache hit," then the tag unit 420 interfaces with the data unit 440 to retrieve the data associated with the requested block of memory locally—without interfacing with the DRAM 220. If, however, the memory access request is a write request, then the tag look-up unit 430 first determines whether the data associated with the command can be written over data currently residing within one of the L2 cache lines 445. If so, again meaning that there is a cache hit, then the tag look-up unit 430 causes the data associated with the specified block of memory to be written to the appropriate location of the L2 cache lines 445.

In the case of a "cache miss," meaning that the data associated with the specified block of memory is not resident in (in the case of a read command) or cannot be written to (in the case of a write command) one of the L2 cache lines 445, then the tag unit 430 interfaces with the DRAM 220 via read and write requests that execute the memory access request. In general, if the tag unit 430 issues a read request, then after storing the data in the specified block of memory, the tag unit 430 configures the DRAM 220 to transmit the specified block of memory to the data unit 440 for storage in one or more corresponding L2 cache lines 445. In alternate embodiments, the L2 cache 410 may implement any techniques and/or policies for managing the data between the L2 cache lines 445 and the DRAM 220.

To increase effective memory bandwidth to the DRAM 220, thereby improving overall performance, the L2 cache 410 stores certain data within the DRAM 220 and the L2 cache lines 445 in one or more compressed formats that reduce the number of bytes used to represent each of the blocks of original data. Consequently, at any given time, the DRAM 220 and the L2 cache lines 445 may include any number of compressed blocks of data and any number of non-compressed blocks of data.

As shown, the DRAM 220 includes, without limitation, any number of groups of blocks (GOB) 490 and each of the GOBs 490 includes, without limitation, a left physical tile 492 and a right physical tile 494. Each of the left physical tile 492 and the right physical tile 494 includes the number of bytes required to store a non-compressed block of data. Further, each of the GOBs 490 spans a contiguous range of physical addresses (PAs)—the left physical tile 492 spans the lower half of the range of PAs and the right physical tile 494 spans the upper half of the range of PAs.

As part of writing a block of data in a non-compressed format, the L2 cache 410 stores the non-compressed data in either the left physical tile 492 or the right physical tile 494. By contrast, if the L2 cache 410 writes a block of a data in a compressed format, then the L2 cache 410 stores the compressed data in a "segment" of the left physical tile 492 or a portion of the right physical tile 494. Each such segment is referred to herein as a "compression atom" and includes the number of bytes required to store the compressed data based on the compression format implemented by the parallel processing subsystem 112. Further, as referred to herein, a "DRAM atom" is the data that the L2 cache 410 transmits to and from the DRAM 202 as part of performing, respectively, a write or read operation. Consequently, each DRAM atom includes the number of bytes that the L2 cache 410 transmits to or from the DRAM 202. The size of the compression atom and the size of the DRAM atom reflect the technologies implemented in the parallel processing subsystem 112.

For explanatory purposes only, the context of FIGS. 4-8 is that the parallel processing subsystem 112 supports a 32 byte compression atom, an eight-to-1 (8:1) compression format, and a 64 byte DRAM atom. Each of the GOBs 490 stores 512 bytes of data across sixteen 32 byte segments. Of the 512 bytes of data, 256 bytes are stored in the left physical tile 492 across eight 32 byte segments and 256 bytes are stored in the right physical tile 455 across the remaining eight 32 byte segments. In a complementary fashion, each of the L2 cache lines 445 stores 128 bytes of data across four 32 byte segments.

In alternate embodiments, the techniques outlined herein may be applied to any parallel processing subsystem that supports any size of DRAM atom, any size(s) of compression atom and any number of compression formats. Further, the techniques are applicable to any type of memory and any type of memory access requests. Notably, the memory may be organized in any technically feasible fashion. For example, each GOB may include four tiles instead of two tiles. Further, in some embodiments, virtual tiles may be stored across multiple GOBs that may or may not be contiguous.

If the L2 cache 410 accesses non-compressed data stored in the DRAM 220, then the L2 cache 410 performs multiple read or write operations—accessing either the eight 32 byte segments in left physical tile 492 or the eight 32 byte segments in the right physical tile 494. Further, as part of reading non-compressed data from the DRAM 220, the L2 cache 410 stores the data associated with the eight 32 byte segments across two of the L2 cache lines 445. If, however, the L2 cache 410 writes compressed data to the DRAM 220, then the L2 cache 410 stores a single 32 byte compression atom within one of the 32 byte segments in the DRAM 220. If the L2 cache 410 reads compressed data from the DRAM 220, then the L2 cache 410 reads two 32 byte DRAM segments. Together, the two 32 byte DRAM segments correspond to the 64 byte DRAM atom. Further, as part of reading compressed data from the DRAM 220, the L2 cache 410 stores data associated with two 32 byte segments in one of the L2 cache lines 445.

Notably, when the size of the compression atom differs from the size of the DRAM atom, parallel processing subsystems that include conventional L2 caches may not be able to fully utilize the memory bandwidth when performing compressed data accesses and the overall performance of the parallel processing subsystem may be reduced. More specifically, to read a compressed block of data, the conventional L2 cache would retrieve a 62 byte DRAM atom that includes 32 bytes of compressed data and 32 bytes of meaningless data from either the left physical tile or the right physical tile included in one of the GOBs. Accordingly, half of the memory bandwidth between the conventional L2 cache and the DRAM would be wasted.

Configuring Groups of Blocks to Optimize Memory Accesses

Advantageously, to avoid wasting memory bandwidth, the L2 cache 410 organizes the memory in the DRAM 220 to optimize memory accesses of compressed data. In general, the CBC 420 introduces a layer of indirection between the memory access request and the corresponding data location (i.e., within the left physical tile 492 or within the right physical tile 494 in the GOB 490). Using this layer of indirection, the CBC 420 configures the tag unit 430 to coalesce compressed data within the DRAM 220 without impacting the interface to the clients of the L2 cache 210 (such as the ROP 480). If compressed data associated with both the left virtual tile and compressed data associated with the right virtual tile are both stored within the GOB 490, then the CBC 420 ensures that the compressed data is stored in two adjacent 32 byte sectors within either the left physical tile 492 or the right physical tile 494. Since the DRAM atom is 64 bytes, when the L2 cache 410 reads compressed data from the DRAM 220, the L2 cache 410 receives 64 bytes of useful data—the compressed data associated with the left virtual tile and the compressed data associated with the right virtual tile. Consequently, the memory bandwidth is optimized and the performance of the parallel processing subsystem 112 is improved compared to a parallel processing subsystem that implements a conventional L2 cache.

In operation, upon receiving a memory access request, the CBC 420 determines the GOB 490 and a "virtual tile" included in the GOB 490 based on the physical address (PA) associated with the memory access request. More specifically, the CBC 420 determines the range of PAs and, consequently, the GOB 490 that includes the PA associated with the memory access request. As referred to herein, if no writes have occurred to the GOB 490, then the GOB 490 stores "uninitialized" or "zero" data. Subsequently, if the PA associated with the memory access request lies in the lower half of the PA range, then the CBC 420 determines that the corresponding data is stored in the "left virtual tile (VT)." If, however, the PA associated with the memory access request lies in the upper half of the PA range, then the CBC 420 determines that the corresponding data is stored in the "right virtual tile (VT)." In alternate embodiments, the CBC 420 may partition the GOB 490 into any number of virtual tiles and "map" the memory access request to these virtual tiles in any technically feasible fashion.

As shown in FIG. 4, for each of the GOBs 490, the CBC 420 includes GOB compression bits 425 that reflects the compression status of the GOB 490. For example, the CBC 420 includes the GOB compression bits 425(5) that reflects the compression state of the GOB 490(5). The compression bits 425 include, without limitation, format bits for the left virtual tile and the right virtual tile in addition to a flip bit. The format bits specify the compression format in which the data associated with each of the virtual tiles is stored in the GOB 490 and, if resident in the data unit 440, the corresponding L2 cache line 445. The format bits may include any number of bits that can comprehensively encode the possible permutations of compression formats for the virtual tiles. Further, the format bits may encode other data, such as a "dirty" status in addition to the compression formats of each of the virtual tiles.

The flip bit specifies the location at which the data associated with the left virtual tile is stored within the GOB 490. If the flip bit is "false," then the data associated with the left virtual tile is stored in the left physical tile 492. If the format bits specify that the data associated with the left virtual tile is compressed, then the data associated with the left virtual tile is store in the first 32 byte sector of the left physical tile 492. If the format bits specify that the data associated with the left virtual tile is non-compressed, then the data associated with the left virtual tile is stored across all eight 32 byte sectors of the left physical tile 492.

If, however, the flip bit is "true," then the data associated with the left virtual tile is stored in the right physical tile 494. If the format bits specify that the data associated with the left virtual tile is compressed, then the data associated with the left virtual tile is store in the second 32 byte sector of the right physical tile 494. If the format bits specify that the data associated with the left virtual tile is non-compressed, then the data associated with the left virtual tile is stored across all eight 32 byte sectors of the right physical tile 494.

In a complementary fashion, the location at which the data associated with the right virtual tile is stored within the GOB 490 is encoded as a combination of the format bits and the flip bit. If the format bits specify that both the data associated with the left virtual tile and the right virtual tile are compressed, then the compressed data associated with the right virtual tile is stored adjacent to the compressed data associated with the left virtual tile. For example, if the flip bit is false, then the compressed data associated with the left virtual tile is stored in the first 32 byte sector of the left physical tile 492 and the compressed data associated with the right virtual tile is stored in the second 32 byte sector of the left physical tile 492. By contrast, if the flip bit is true, then the compressed data associated with the right virtual tile is stored in the first 32 byte sector of the right physical tile 492 and the compressed data associated with the left virtual tile is stored in the second 32 byte sector of the right physical tile 494.

If the format bits specify that at least one of the data associated with the left virtual tile or the right virtual tile are non-compressed, then the data associated with the left virtual tile is stored in one of the physical tiles and the data associated with the right virtual tile is stored in the remaining physical tile. More specifically, if the flip bit is false, then the data associated with the right virtual tile is stored in the right physical tile 494. By contrast, if the flip bit is true, then the data associated with the right virtual tile is stored in the left physical tile 492.

Based on the values of the compression bits 425 and the type of the memory access request, the CBC 425 updates the compression bits 425 to both maximize the contiguous sectors of compressed data and minimize the relocation of existing data. For example, suppose that the compression bits 425 specify that compressed data associated with a right virtual tile is stored in the first 32 bits of the right physical tile 494(1) and the CBC 425 receives a memory access request to write compressed data that is associated with the left virtual tile. In such a scenario, the CBC 425 would modify the compression bits 425 to specify that the compressed data that is associated with the left virtual tile is stored in the second 32 bits of the right physical tile 494(1). In this manner, the CBC 425 coalesces the compressed data without perturbing data that is not associated with the memory access request (i.e., the data associated with the right virtual tile).

The CBC 425 also uses the compression bits 425 to optimize writes of non-compressed data and decompression of compressed data that is currently stored in the DRAM 220. For example, suppose that the compression bits 425 specify that compressed data associated with a right virtual tile is stored in the first 32 bits of the right physical tile 494(1) and compressed data associated with a left virtual tile is stored in the second 32 bits of the right physical tile 494(1). Suppose that the CBC 425 then receives a memory access request that involves decompressing data associated with the left virtual tile. The L2 cache 410 would access the compressed data associated with the left virtual tile as per the compression bits 425 and then decompress this compressed data to create non-compressed data associated with the left virtual tile. Subsequently, the CBC 425 would modify the compression bits 425 to specify that non-compressed data associated with the left virtual tile is stored in the left physical tile 490, without altering the location of the compressed data associated with the right virtual tile. Since the CBC 425 does not direct the tag unit 430 (via the compression bits 425) to change the format or location of the data associated with the right virtual tile, the number of operations that the tag unit 420 executes to process the memory access request is minimized.

After the CBC 425 updates the compression bits 425, the tag unit 430 executes the memory access request as per the compression bits 425. More specifically, the tag unit 430 determines the location for the data associated with the memory access request within the L2 cache lines 445 and/or the DRAM 220 based on the compression bits 425. The tag unit 430 then orchestrates the read and/or write operations that implement the memory access request. In alternate embodiments, the CBC 420 may store and communicate the organization of the memory to the tag unit 430 in any technically feasible fashion that enables a consistent and deterministic interpretation of the locations of data in the memory.

Figure 5:
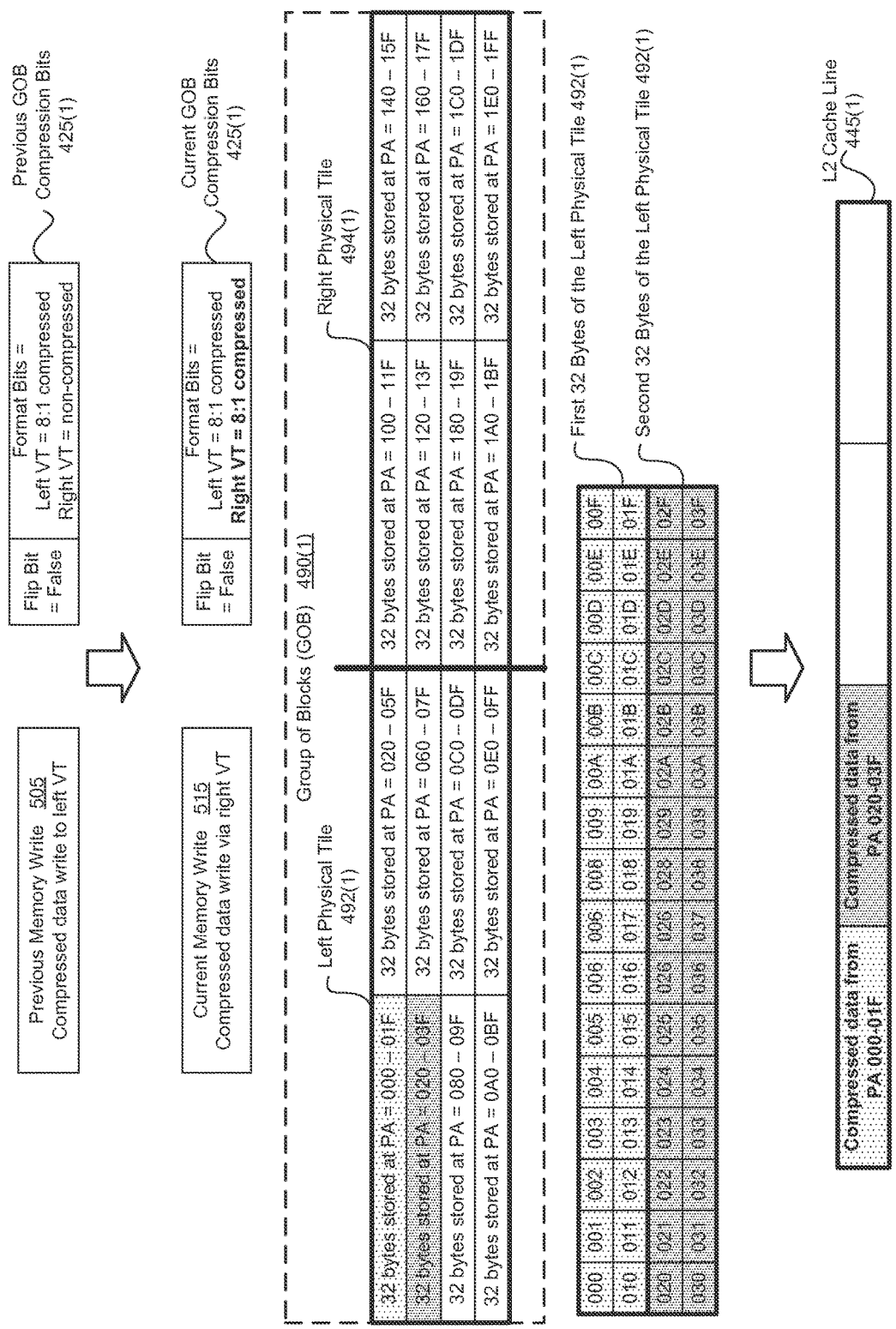
FIG. 5 illustrates how the L2 cache of FIG. 4 is configured to store compressed data, according to various embodiments of the present invention.

FIG. 5 illustrates how the L2 cache 410 of FIG. 4 is configured to store compressed data, according to various embodiments of the present invention. In particular, FIG. 5 illustrates how the L2 cache 410 stores compressed data associated with a right virtual tile adjacent to compressed data associated with a left virtual tile and stored in the left physical tile 492(1).

In the context of FIG. 5, the L2 cache 410 has performed a previous memory write 505—a compressed data write to the left virtual tile associated with the GOB 490(1). As part of processing the previous memory write 505, the CBC 420 has set the previous GOB compression bits 425(1). More specifically, the CBC 420 has set the flip bit to false and the format bits to specify that the left virtual tile is eight-to-one (8:1) compressed and the right virtual tile is non-compressed. Notably, the L2 cache 410 may have performed the previous memory write 505 at any previous time. The previous GOB compression bits 425(1) define the organization of data within the GOB 490(1) without any temporal dependence.

Upon receiving a current memory write 515—a compressed data write via a right virtual tile associated with the GOB 490(1)—the CBC 420 updates the previous GOB compression bits 425(1) to the current GOB compression bits 425(1). As described in conjunction with FIG. 4, if the data associated with the left virtual tile is compressed and the data associated with the right virtual tile is compressed, then the CBC 420 assigns the compressed data to a single physical tile. Since the previous GOB compression bits 425(1) specify that compressed data associated with the left virtual tile is stored in the left physical tile 492(1), the CBC 420 sets the current GOB compression bits 425(1) to assign the compressed data associated with the right virtual tile to the left physical tile 492(1). More specifically, as shown, the CBC 420 updates the format bits to specify that the right virtual tile is 8:1 compressed without changing the format of the left virtual tile, and does not update the flip bit.

The CBC 420 then transmits the current GOB compression bits 425(1) to the tag unit 430. As described in detail in conjunction with FIG. 4, the tag unit 430 determines the storage location of the data associated with the right virtual tile based on both the format bits and the flip bit. Since the format bits specify that the data associated with both the left virtual tile and the right virtual tile are compressed and the flip bit specifies that the left virtual tile is stored in the left physical tile 492(1), the tag unit 430 stores the compressed data associated with the right virtual tile in the left physical tile 492(1).

More precisely, as depicted by the darkly shaded region in the left physical tile 492(1), the tag unit 430 stores the compressed data associated with the right virtual tile in a second 32 bytes of the left physical tile 492(1). As shown, the second 32 bytes of the left physical tile 492(1) correspond to the physical addresses (PAs) 020-03F. Further, as depicted by the lightly shaded region in the left physical tile 492(1), the tag unit 430 has previously stored the compressed data associated with the left virtual tile in a first 32 bytes of the left physical tile 492(1) (corresponding to the PAs 000-01F). Therefore, as a result of the current memory write 515, the compressed data associated with the left virtual tile and the compressed data associated with the right virtual tile are stored in 64 bytes of contiguous memory (from PA 000-03F) in the left physical tile 492(1).

Based on the current GOB compression bits 425(1), upon receiving a subsequent compressed read request associated with the GOB 490(1), the tag unit 430 fetches the first 64 bytes of data from the left physical tile 492(2) and then stores the data in the L2 cache line 445(1). More specifically, the tag unit 420 stores the compressed data associated with the left virtual tile in a first sector included in the L2 cache line 445(1) and the compressed data associated with the right virtual tile in a second sector included in the L2 cache line 445(1). In general, storing compressed data in contiguous locations within the same physical tile enables the L2 cache 420 to fully utilize the memory bandwidth between the L2 cache 420 and the DRAM 220. By contrast, a conventional L2 cache would fetch either the compressed data associated with the left virtual tile from the left physical tile or the compressed data associated with the right virtual tile from the right physical tile along with 32 bytes of irrelevant data, thereby wasting half of the memory bandwidth.

Figure 6:
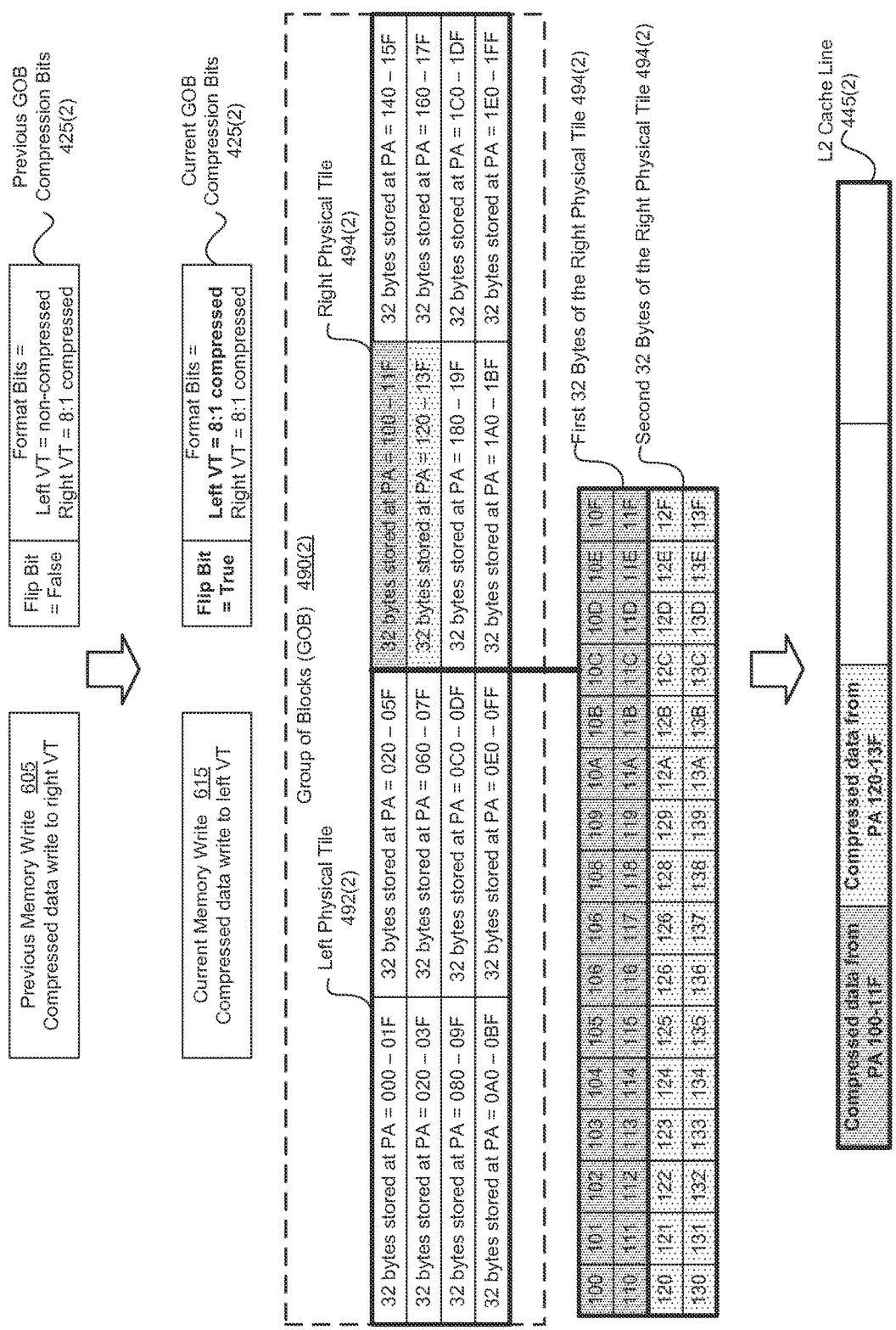
FIG. 6 illustrates how the L2 cache of FIG. 4 is configured to store compressed data, according to various other embodiments of the present invention.

FIG. 6 illustrates how the L2 cache 410 of FIG. 4 is configured to store compressed data, according to various other embodiments of the present invention. In particular, FIG. 6 illustrates how the L2 cache 410 stores compressed data associated with a left virtual tile adjacent to compressed data associated with a right virtual tile and stored in the right physical tile 494(2), according to one embodiment of the present invention.

In the context of FIG. 6, the L2 cache 410 has performed a previous memory write 605—a compressed data write via a right virtual tile associated with the GOB 490(2). As part of processing the previous memory write 605, the CBC 420 has set the previous GOB compression bits 425(2). More specifically, the CBC 420 has set the flip bit to false and the format bits to specify that the left virtual tile is non-compressed and the right virtual tile is 8:1 compressed. Notably, the L2 cache 410 may have performed the previous memory write 605 at any previous time. The previous GOB compression bits 425(2) define the organization of data within the GOB 490(2) without any temporal dependence.

Upon receiving a current memory write 615—a compressed data write via a left virtual tile associated with the GOB 490(2)—the CBC 420 updates the previous GOB compression bits 425(2) to the current GOB compression bits 425(2). As described in conjunction with FIG. 4, if the data associated with the left virtual tile is compressed and the data associated with the right virtual tile is compressed, then the CBC 420 assigns the compressed data to a single physical tile. Since the previous GOB compression bits 425(2) specify that compressed data associated with the right virtual tile is stored in the right physical tile 494(2), the CBC 420 sets the current GOB compression bits 425(2) to assign the compressed data associated with the left virtual tile to the right physical tile 494(2). More specifically, as shown, the CBC 420 updates the flip bit to true (indicating that the data associated with the left virtual tile is stored in the right physical tile 494(2)) and the format bits to specify that the left virtual tile is 8:1 compressed without changing the format of the right virtual tile.

The CBC 420 then transmits the current GOB compression bits 425(2) to the tag unit 430. As described in detail in conjunction with FIG. 4, the tag unit 430 determines the storage location of the data associated with the left virtual tile based on the flip bit. Since the format bits specify that the data associated with the left virtual tile is compressed and the flip bit specifies that the left virtual tile is stored in the right physical tile 494(2), the tag unit 430 stores the compressed data associated with the left virtual tile in the right physical tile 494(2).

More precisely, as depicted by the lightly shaded region in the right physical tile 494(2), the tag unit 430 stores the compressed data associated with the left virtual tile in a second 32 bytes of the right physical tile 494(2). As shown, the second 32 bytes of the right physical tile 494(1) correspond to the PAs 120-13F. Further, as depicted by the darkly shaded region in the right physical tile 494(2), the tag unit 430 has previously stored the compressed data associated with the right virtual tile in a first 32 bytes of the right physical tile 494(2) (corresponding to the PAs 100-11F). Therefore, as a result of the current memory write 615, the compressed data associated with the right virtual tile and the compressed data associated with the left virtual tile are stored in 64 bytes of contiguous memory (from PA 100-13F) in the right physical tile 494(2).

Based on the current GOB compression bits 425(2), upon receiving a subsequent compressed read request associated with the GOB 490(2), the tag unit 430 fetches the first 64 bytes of data from the right physical tile 494(2) and then stores the data in the L2 cache line 445(2). More specifically, the tag unit 420 stores the compressed data associated with the right virtual tile in a first sector included in the L2 cache line 445(2) and the compressed data associated with the left virtual tile in a second sector included in the L2 cache line 445(2). In general, storing compressed data in contiguous locations within the same physical tile enables the L2 cache 420 to fully utilize the memory bandwidth between the L2 cache 420 and the DRAM 220. By contrast, a conventional L2 cache would fetch either the compressed data associated with the left virtual tile from the left physical tile or the compressed data associated with the right virtual tile from the right physical tile along with 32 bytes of irrelevant data, thereby wasting half of the memory bandwidth. Further, in a conventional L2 cache, the compressed data associated with the left virtual tile and the compressed data associated with the right virtual tile typically occupy two L2 cache lines.

Figure 7:
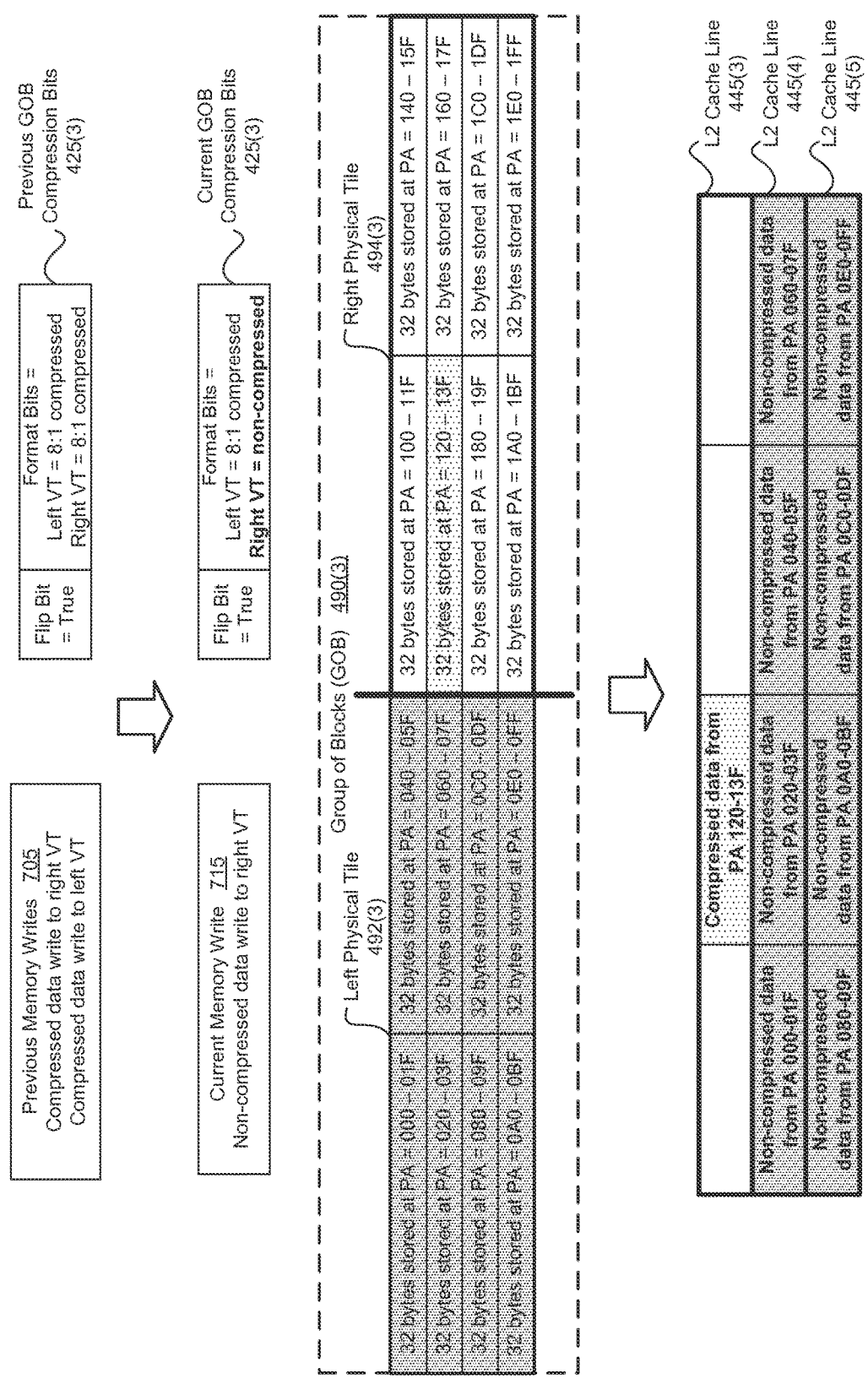
FIG. 7 illustrates how the L2 cache of FIG. 4 is configured to store non-compressed data, according to various embodiments of the present invention.

FIG. 7 illustrates how the L2 cache 410 of FIG. 4 is configured to store non-compressed data, according to various embodiments of the present invention. In particular, FIG. 7 illustrates how the L2 cache 410 stores non-compressed data associated with a right virtual tile in the left physical tile 494(3).

In the context of FIG. 7, the L2 cache 410 has performed two previous memory writes 705—a compressed data write via a right virtual tile associated with the GOB 490(3) followed by a compressed data write via a left virtual tile associated with the GOB 490(3). While processing the second of the previous memory writes 675, the CBC 420 has set the previous GOB compression bits 425(3). More specifically, the CBC 420 has set the flip bit to true and the format bits to specify that both the left virtual tile and the right virtual tile are 8:1 compressed. Based on the previous GOB compression bits 425(3), the compressed data associated with the left virtual tile is stored in the second 32 bytes of right physical tile 494(3) and the compressed data associated with the right virtual tile is stored in the first 32 bytes of the right physical tile 494(3).

Upon receiving a current memory write 715—a non-compressed data write via a right virtual tile associated with the GOB 490(2)—the CBC 420 updates the previous GOB compression bits 425(3) to the current GOB compression bits 425(3). To avoid overwriting or moving the data associated with the left virtual tile, the CBC 420 sets the current GOB compression bits 425(3) to assign the non-compressed data associated with the right virtual tile to the left physical tile 492(3). Accordingly, as shown, the CBC 420 updates the format bits to specify that the right virtual tile is non-compressed without changing the format of the left virtual tile. Since the data associated with the left virtual tile is still stored in the right physical tile 494(3), the CBC 420 does not change the value of the flip bit (true).

The CBC 420 then transmits the current GOB compression bits 425(3) to the tag unit 430. As described in detail in conjunction with FIG. 4, the tag unit 430 determines the storage location of the data associated with the right virtual tile based on both the format bits and the flip bit. Since the format bits specify that the data associated with the right virtual tile is non-compressed and the flip bit specifies that the left virtual tile is stored in the right physical tile 492(3), the tag unit 430 stores the non-compressed data associated with the right virtual tile in the left physical tile 492(3).

More precisely, as depicted by the darkly shaded left physical tile 494(3), the tag unit 430 stores the non-compressed data associated with the right virtual tile across all 256 bytes of the left physical tile 492(3) (corresponding to the PAs 000-0FF). Further, as depicted by the lightly shaded region, the tag unit 430 does not disturb the compressed data associated with the left virtual tile that is stored in the second 32 bytes of the right physical tile 494(3) (corresponding to the PAs 120-13F).

Based on the current GOB compression bits 425(3), upon receiving a subsequent non-compressed read request associated with the GOB 490(3), the tag unit 430 performs four 64 byte data fetches. Together, the four data fetches copy the 256 bytes of non-compressed data from the left physical tile 494(3) to the L2 cache lines 445(4) and 445(5). Advantageously, as shown, the tag unit 420 does not modify the L2 cache line 445(3) that includes the compressed data associated with the right virtual tile.

Figure 8:
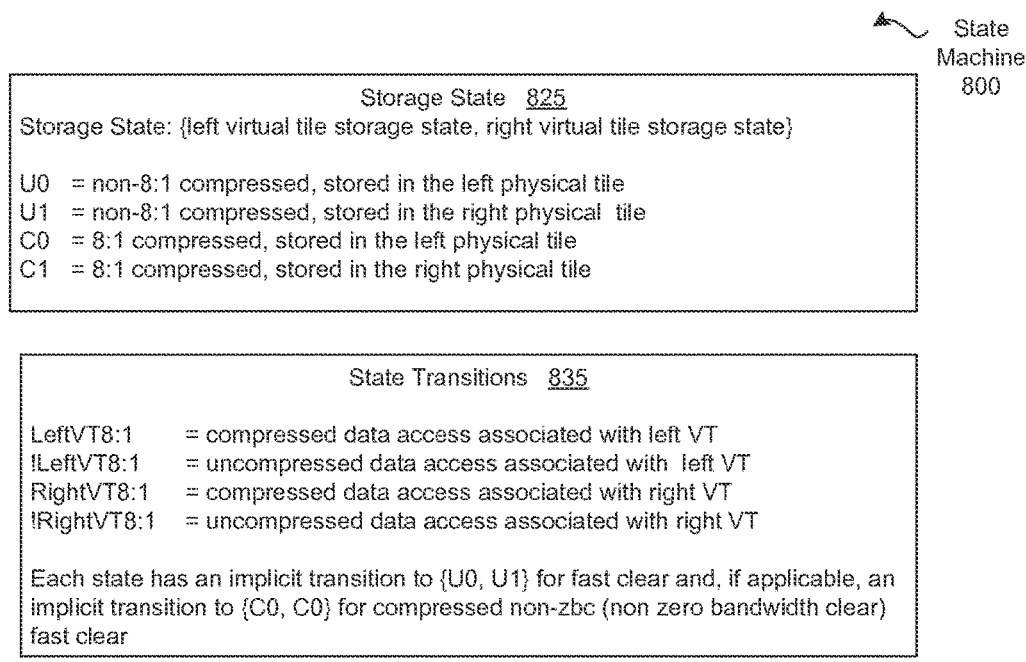
FIG. 8 illustrates a state machine that the compression bit cache of FIG. 4 may be configured to implement to determine different storage states, according to various embodiments of the present invention.
Figure 8:
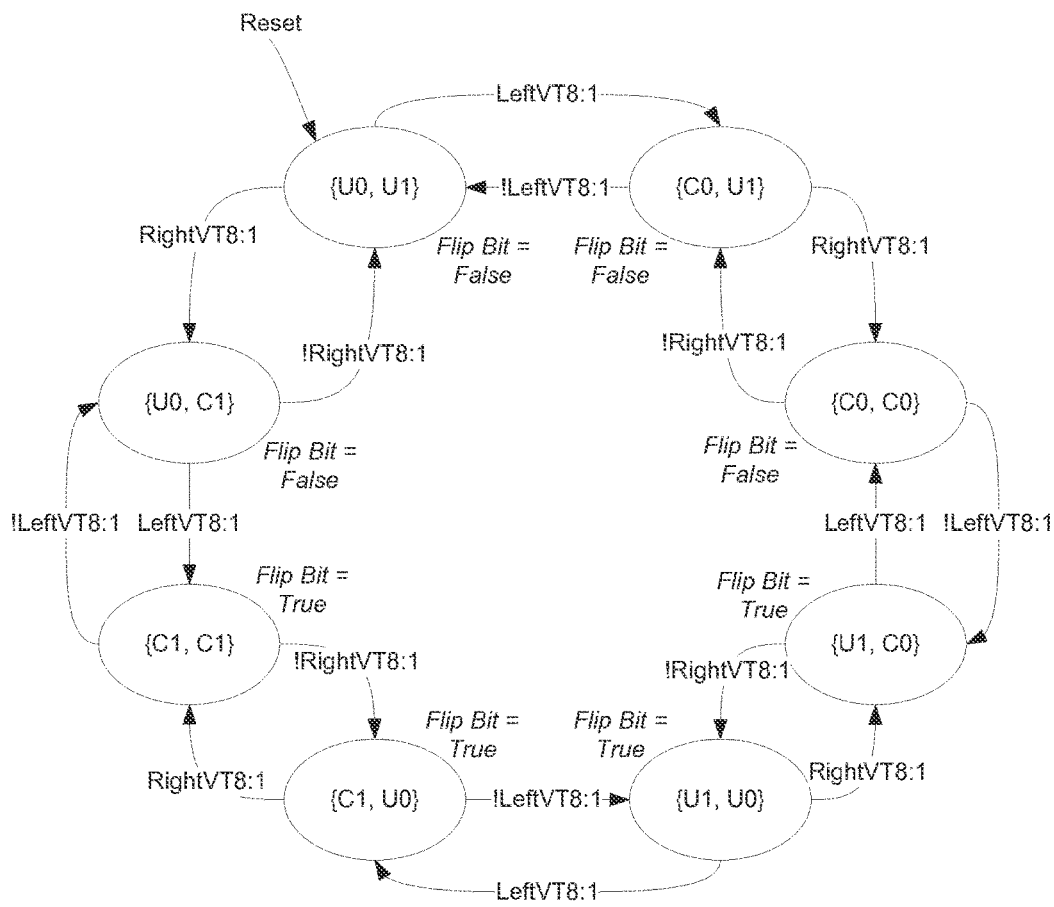

FIG. 8 illustrates a state machine 800 that the compression bit cache 420 of FIG. 4 may be configured to implement to determine different storage states 825, according to various embodiments of the current invention. Upon receiving a memory access request that involves the GOB 490(i), the compression bit cache (CBC) 420 determines a new storage state based on the previous storage state 825 (encoded in the GOB compression bits 425(i)) and the type of the memory access request. The CBC 420 then updates the GOB compression bits 425(i) to reflect the new storage state 825.

As shown, the state machine 800 includes eight distinct storage states 825, where each of the storage states 825 includes, without limitation, a left virtual tile storage state and a right virtual tile storage state. For explanatory purposes, the flip bit included in the GOB compression bits 425 is depicted as a label for each of the storage stages 825 in the state machine 805. However, as described previously herein, the flip bit may be derived from the left virtual tile storage state and the right virtual tile storage state without additional information:

| Flip Bit | Left Virtual Tile Storage State | Right Virtual Tile Storage State |
|---|---|---|
| False | Non-compressed in left physical tile | Non-compressed in right virtual tile |
| False | 8:1 compressed in left physical tile | Non-compressed in right virtual tile |
| False | 8:1 compressed in left physical tile | 8:1 compressed in left physical tile |
| True | Non-compressed in right physical tile | 8:1 compressed in left physical tile |
| True | Non-compressed in right physical tile | Non-compressed in left physical tile |
| True | 8:1 compressed in right physical tile | Non-compressed in left physical tile |
| True | 8:1 compressed in right physical tile | 8:1 compressed in right physical tile |
| False | Non-compressed in left physical tile | 8:1 compressed in right physical tile |

In operation, for each of the GOBs 490, the L2 cache 410 sets the corresponding storage state 825 to an initial state in which the left virtual tile accesses non-compressed data that is stored in the left physical tile 492 and the right virtual tile accesses non-compressed data that is mapped to the right physical tile 494. More specifically, as part of initialization operations, the L2 cache 410 sets each of the GOB compression bits 425 based on the initial state.

Four different types of state transactions 835 may trigger a change in the storage state 825: a compressed data access associated with a left virtual tile, a non-compressed data access associated a left virtual tile, a compressed data access associated with a right virtual tile, and a non-compressed data access associated with a right virtual tile. If the CBC 420 receives a memory access request for data in a format that matches the current storage state 825, then the storage state 825 does not change, and the CBC 420 does not update the GOB compression bits 425. For example, if the storage state 825 specifies that compressed data associated with the left virtual tile is stored in the right physical tile and the CBC 420 receives a memory request to write compressed data to the left virtual tile, then the CBC 420 does not change the GOB compression bits 425.

In alternate embodiments, instead of implementing the state machine 800, the CBC 420 may implement any technically feasible algorithm that enables the CBC 420 to determine new values for the GOB compression bits 425 based on the current values and a memory access request. Further, the CBC 420 may replace the GOB compression bits 425 with any technically feasible method of organizing data within the GOB 490 to optimize data accesses. In some embodiments, the PAs corresponding to the GOB 490 may be arranged into any number of physical tiles and the GOB compression bits 425 may include any number of additional bits that enable the L2 cache 410 to effectively coalesce compressed data associated with any number of virtual tiles within a subset of the physical tiles.

For explanatory purposes, the capabilities of the L2 cache 410 to optimize memory accesses of compressed data are described in detail herein. However, in alternate embodiments, the L2 cache 410 may apply the disclosed techniques to optimize memory accesses of data based on excepted access patterns instead of or in addition to compression status. For example, and without limitation, the L2 cache 310 may be configured to opportunistically store one or more sets of data that would typically be stored in separate physical tiles in a single physical tile.

More specifically, memory access requests associated with textures oftentimes read a particular set of samples from different physical tiles. In a conventional L2 cache, processing such memory access requests requires multiple fetches from the DRAM 220 and the fetched data occupies multiple L2 cache lines 445. By contrast, the L2 cache 410 may be configured to implement the disclosed techniques based on the excepted access pattern associated with the particular set of samples. Accordingly, the L2 cache 410 may store data associated with the particular set of samples together in a single physical tile instead of multiple physical tiles. As persons skilled in the art will recognize, coalescing the storage of the set of samples in this manner provides the benefits associated with perfecting texture requests in response to an L2 cache miss.

Notably, other elements included in the PPU 202 may be modified to implement optimized storage based on access patterns. For example, during the rendering phase, the L2 cache 410 may be configured to optimize storage based on access patterns. Subsequently, to ensure a consistent interpretation of data, the L2 cache 410 may communicate to clients of the L2 cache 410 that the L2 cache 410 has reordered the data to optimize the storage.

Figure 9:
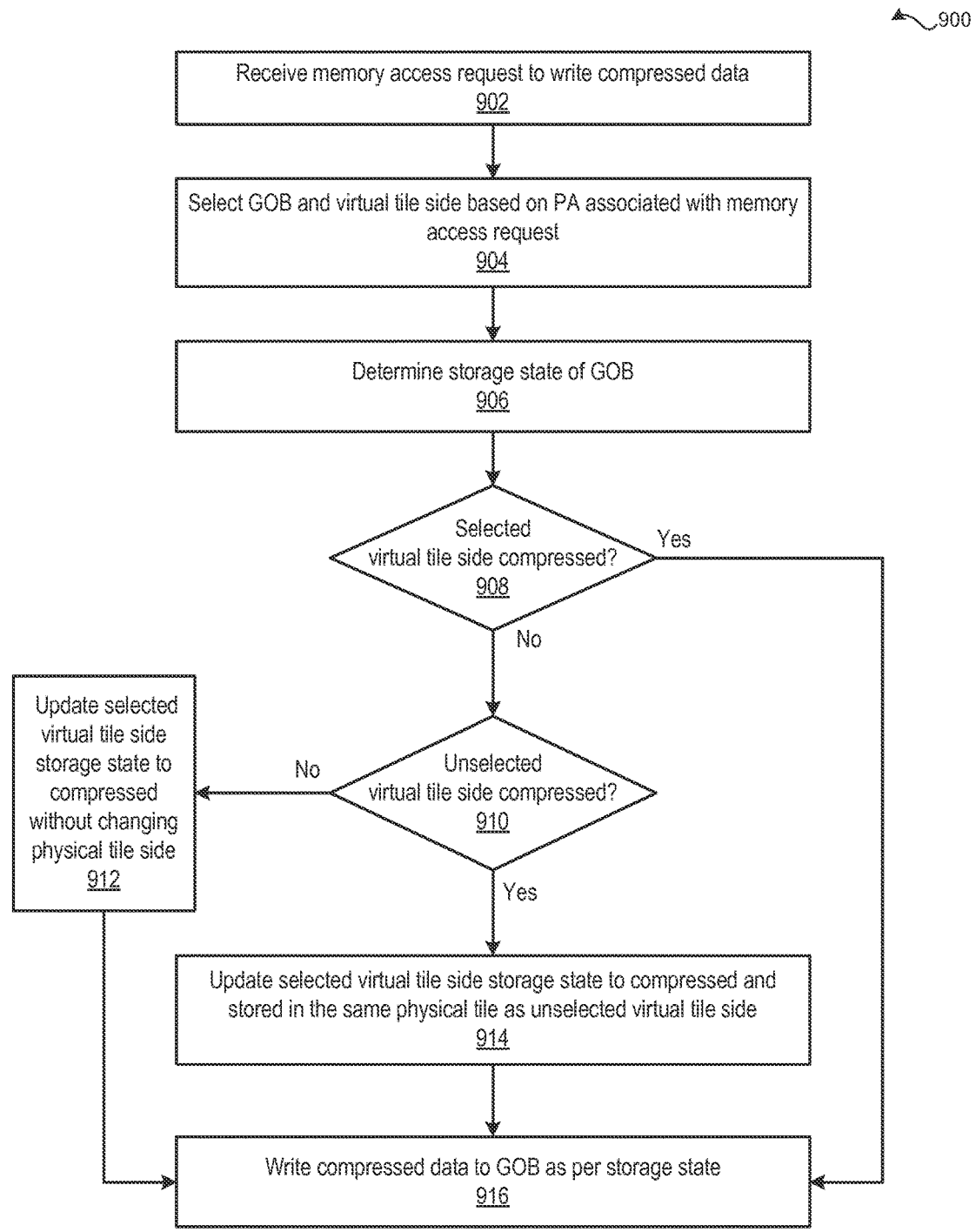
FIG. 9 is a flow diagram of method steps for writing compressed data to memory, according to various embodiments of the present invention.

FIG. 9 is a flow diagram of method steps for writing compressed data to memory via a virtual address, according to various embodiments of the present invention. Although the method steps are described in conjunction with the systems of FIGS. 1-8, persons skilled in the art will understand that any system configured to implement the method steps, in any order, falls within the scope of the present invention.

As shown, a method 900 begins at step 902, where the L2 cache 410 receives a memory access request to write compressed data. At step 904, the L2 cache 410 selects the GOB 490 and the virtual tile side. More specifically, the L2 cache 410 selects the GOB 490 that spans a physical address (PA) range that includes the physical address (PA) associated with the memory access request. If the PA associated with the memory access request lies within the lower half the PA range, then the L2 cache 410 selects the left virtual tile side. By contrast, if the PA associated with the memory access request lies within the upper half of the PA range, then the L2 cache 410 selects the right virtual tile side.

At step 906, the CBC 420 determines the storage state 825 of the selected GOB 490. The CBC 420 may determine the storage state 825 in any technically feasible fashion. In some embodiments, the CBC 420 may evaluate the GOB compression bits 425 to determine the storage state 825. At step 908, based on the storage state 825, the CBC 420 determines whether the data included in the selected virtual tile side is compressed or non-compressed. If, at step 908, the CBC 420 determines that the data included in the selected virtual tile side is non-compressed, then method 900 proceeds to step 910.

At step 910, based on the storage state 825, the CBC 420 determines whether the data included in the unselected virtual tile side is compressed or non-compressed. For example, as part of step 910, if the selected virtual tile side is the left virtual tile side, then the CBC 420 determines whether the data included in the right virtual tile side is compressed or non-compressed based on the storage state 825. If, at step 910, the CBC 420 determines that the data included in the unselected virtual tile side is non-compressed, then the method proceeds to step 912.

At step 912, the CBC 420 updates the storage state 825 to specify that the data associated with the selected virtual tile side is compressed. Notably, because the data associated with the unselected virtual tile side is non-compressed, the CBC 420 does not change the physical tile side that stores the data associated with the virtual tile side. In general, to optimize performance (i.e., reduce operations), the CBC 420 does not move the data associated with the unselected virtual tile side. The method 900 then proceeds directly to step 916.

If, however, at step 910, the CBC 420 determines that the data included in the unselected virtual tile side is compressed, then the method 900 proceeds to step 914. At step 914, the CBC 420 updates the storage state 825 to specify that the data associated with the selected virtual tile side is compressed and is stored in the physical tile that stores the compressed data associated with the unselected virtual tile side. In this manner, the CBC 420 ensures that the compressed data associated with the selected virtual tile side is stored adjacent to, and within the same physical tile, as the compressed data associated with the unselected virtual tile side. In general, conjoining compressed data to form regions that are sized to match the size of the memory atom enables the L2 cache 410 to optimize the memory bandwidth when subsequently accessing compressed data from the memory. The method 900 then proceeds to step 916.

If, however, at step 908, the CBC 420 determines that the data included in the selected virtual tile side is compressed, then the method 900 proceeds directly to step 916. Notably, since the format of the data included in the memory request matches the format of the data that is already stored in the selected virtual tile side, then the CBC 420 does not change the storage state 825 of the selected GOB 490.

At step 916, the tag unit 420 writes the compressed data included in the memory request to the selected GOB 490 as per the storage state 825. In some embodiments, as part of step 916, the CBC 420 updates the GOB compression bits 425 to reflect the storage state 825. Subsequently, the tag unit 420 writes the compressed data included in the memory request to the selected GOB 490 based on the compression bits 425. In general, the CBC 420 may store and communicate the organization of the memory to the tag unit 420 in any technically feasible fashion that enables a consistent and deterministic interpretation of the locations of data in the memory.

Figure 10:
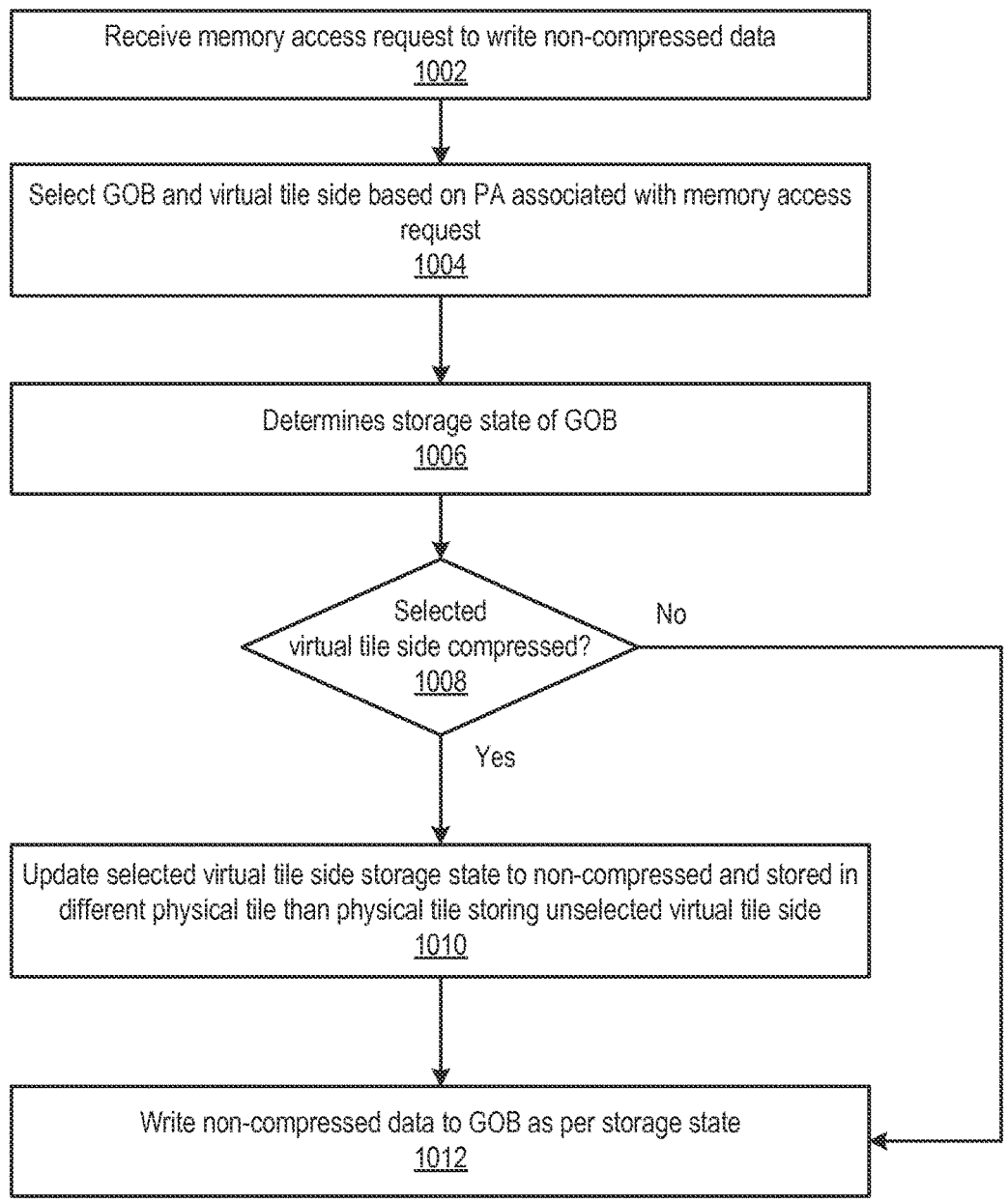
FIG. 10 is a flow diagram of method steps for writing non-compressed data to memory, according to various embodiments of the present invention.

FIG. 10 is a flow diagram of method steps for writing non-compressed data to a memory, according to various embodiments of the present invention. Although the method steps are described in conjunction with the systems of FIGS. 1-8, persons skilled in the art will understand that any system configured to implement the method steps, in any order, falls within the scope of the present invention.

As shown, a method 1000 begins at step 1002, where the L2 cache 410 receives a memory access request to write non-compressed data. At step 1004, the L2 cache 410 selects the GOB 490 and the virtual tile side. More specifically, the L2 cache 410 selects the GOB 490 that spans a physical address (PA) range that includes the PA associated with the memory access request. If the PA associated with the memory access request lies within the lower half the PA range, then the L2 cache 410 selects the left virtual tile side. By contrast, if the PA associated with the memory access request lies within the upper half of the PA range, then the L2 cache 410 selects the right virtual tile side.

At step 1006, the CBC 420 determines the storage state 825 of the selected GOB 490. The CBC 420 may determine the storage state 825 in any technically feasible fashion. In some embodiments, the CBC 420 may evaluate the GOB compression bits 425 to determine the storage state 825. At step 1008, based on the storage state 825, the CBC 420 determines whether the data included in the selected virtual tile side is compressed or non-compressed. If, at step 1008, the CBC 420 determines that the data included in the selected virtual tile side is compressed, then method 1000 proceeds to step 1010.

At step 1010, based on the storage state 825, the CBC 420 updates the storage state 825 to specify that the data associated with the selected virtual tile side is non-compressed and stored in a different physical tile than the data associated with the unselected virtual tile. Significantly, to avoid unnecessarily relocating data, the CBC 420 does not change the physical tile side that stores the data associated with the unselected virtual tile side. For example, suppose that compressed data associated with the left virtual tile and compressed data associated with the right virtual tile were both stored in the right physical tile 494. In such a scenario, the CBC 420 would update the storage state 825 to specify that the data associated with the selected virtual tile side is stored in the left physical tile 492. In general, the CBC 420 does not perturb the data associated with the unselected virtual tile side. The method 1000 then proceeds to step 1012.

If, however, at step 1008, the CBC 420 determines that the data included in the unselected virtual tile side is non-compressed, then the CBC 420 does not alter the storage state 825, and the method 900 proceeds directly to step 1012.

At step 1012, the tag unit 420 writes the non-compressed data included in the memory request to the selected GOB 490 as per the storage state 825. In some embodiments, as part of step 1012, the CBC 420 updates the GOB compression bits 425 to reflect the storage state 825. Subsequently, the tag unit 420 writes the non-compressed data included in the memory request to the selected GOB 490 based on the compression bits 425. In general, the CBC 420 may store and communicate the organization of the memory to the tag unit 420 in any technically feasible fashion that enables a consistent and deterministic interpretation of the locations of data in the memory.

In sum, the disclosed techniques enable a processing system to efficiently access compressed data stored in an attached memory. More specifically, a processing system supports a 32 byte compression atom and a 64 byte DRAM atom and includes a level two (L2) cache that stores and accesses compressed and non-compressed data in groups of blocks (GOBs) based on corresponding GOB states. Each GOB includes two physical tiles: a left physical tile and a right physical tile. Each of the two physical tiles in a GOB includes 256 bytes of contiguous DRAM memory and, together, the two physical tiles include 512 bytes of contiguous memory. Similarly, each GOB is associated with two virtual physical tiles—a left virtual tile is accessed via contiguous physical addresses that are adjacent to and lower than continuous physical address that access a right virtual tile.

The GOB state encodes a flip state, a virtual left tile state, and a virtual right tile state. The flip state specifies whether the data associated with the virtual left tile is mapped to the physical left tile or the physical right tile. The virtual left tile state specifies whether the data associated with the virtual left tile is compressed or non-compressed, and the virtual right tile state specifies whether the data associated with the virtual right tile is compressed or non-compressed. Together, the flip state, the virtual left tile state, and the virtual right tile state enable the L2 cache to determine where and in what form to store and access data within the GOB.

In operation, the L2 cache sets each GOB state to an initial state in which the flip state is false, the left virtual tile accesses non-compressed data that is stored in the left physical tile, and the right virtual tile accesses non-compressed data that is stored in the right physical tile. As the L2 cache processes memory access requests, the L2 cache updates the GOB state, implementing a state machine that determines a new GOB state based on the current GOB state and the type of memory access request. The L2 cache then executes the memory access request as per the current and new GOB states.

Notably, the state machine updates the GOB state such that if both the virtual left tile and the virtual right tile are associated with compressed data, then the L2 cache stores the compressed data in adjacent 32 byte blocks of memory (a total of 64 bytes of contiguous memory). If the flip state is false, then the 64 bytes of compressed data are located in the left physical tile. By contrast, if the flip state is true, then the 64 bytes of compressed data are located in the right physical tile.

Further, if a memory access request involves non-compressed data associated with the left virtual tile, then the state machine ensures that the L2 cache stores the non-compressed data associated with the left virtual tile in the physical tile that does not include the data associated with the right virtual tile. Similarly, if a memory access request involves non-compressed data associated with the right virtual tile, then the state machine ensures that the L2 cache stores the non-compressed data associated with the right virtual tile in the physical tile that does not include the data associated with the left virtual tile. In this fashion, the L2 cache decompresses data associated with one virtual tile without moving the data (either compressed or non-compressed) associated with the other virtual tile.

At least one advantage of the disclosed approach is that the L2 cache optimizes the memory bandwidth between the parallel processing unit and the DRAM during memory accesses of compressed data, thereby improving the performance of the parallel processing system. In particular, because the L2 cache configures the DRAM to store compressed data associated with both the left virtual tile and the right virtual tile in adjacent 32 byte blocks, the L2 cache coalesces useful compressed data into 64 byte regions. As a result, when compressed data is read from the DRAM, 64 bytes of useful compressed data may be transferred to the L2 cache and the memory bandwidth may be fully utilized. By contrast, in conventional parallel processing subsystems, when compressed data is read from the DRAM, only 32 byes of useful compressed data are transferred to the L2 cache, and the memory bandwidth is not fully utilized. Further, because the L2 cache avoids relocating data associated with the "opposite" virtual tile during decompression events associated with a virtual tile, the L2 cache also enables efficient memory accesses of non-compressed data.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A system configured to process memory accesses associated with compressed data, the system comprising:
   a processor; and
   a cache memory coupled to the processor and configured to:
      receive a first memory access request from the processor to write first compressed data to a first physical address within another memory;
      in response, select a first group of blocks within the another memory based on the first physical address;
      determine that a first storage state associated with the first group of blocks indicates that a first physical tile included in the first group of blocks already stores second compressed data;
      in response, store the first compressed data adjacent to the second compressed data in the first physical tile; and
      after storing the first compressed data adjacent to the second compressed data in the first physical tile, read the first compressed data and the second compressed data from the another memory via a single read operation.

2. The system of claim 1, wherein the cache memory is configured to store the first compressed data adjacent to the second compressed data in the first physical tile by:
   updating the first storage state to create a second storage state associated with the first group of blocks that specifies that the first compressed data and the second compressed data are stored in the first physical tile; and
   writing the first compressed data to the another memory based on the second storage state.

3. The system of claim 2, wherein the cache memory is further configured to:
   receive a second memory access request from the processor to read data from the first physical address;
   in response, select the first group of blocks based on the first physical address; and
   read the first compressed data from the first group of blocks based on the second storage state.

4. The system of claim 1, wherein the first storage state is specified by one or more compression bits.

5. The system of claim 4, wherein a first virtual tile is associated with the first physical address, and the one or more compression bits include a flip bit that indicates whether the first virtual tile is associated with the first physical tile or a second physical tile, and one or more format bits specify a data format associated with the first virtual tile and a data format associated with a second virtual tile.

6. The system of claim 5, wherein the cache memory is configured to determine that the first storage state indicates that the first physical tile already stores second compressed data by:
   performing a comparison operation on the flip bit to determine that the first virtual tile is associated with the first physical tile; and
   performing one or more comparison operations on the one or more format bits to determine that the data format associated with the first virtual tile is a compressed data format and that the data format associated with the second virtual tile is a compressed data format.

7. The system of claim 1, wherein the cache memory is further configured to, after reading the first compressed data and the second compressed data from the another memory via the single read operation, store the first compressed data and the second compressed data in a first cache line included in the cache memory.

8. The system of claim 1, wherein a memory bandwidth between the cache memory and the another memory comprises sixty-four bytes, the first compressed data comprises a block of thirty-two byes, the second compressed data comprises a block of thirty-two bytes, and the cache memory is further configured to:
   read the first compressed data and the second compressed data from the another memory as a contiguous block of sixty-four bytes, and
   store the contiguous sixty-four bytes in a first cache line included in the cache memory.

9. The system of claim 1, wherein the cache memory is further configured to, prior to receiving the first memory access request, store the second compressed data by:
   receiving a second memory access request from the processor to write the second compressed data to a second physical address within the another memory, wherein the second physical address is associated with a first virtual tile;
   in response, select the first group of blocks based on the second physical address; and
   determine that a second storage state associated with the first group of blocks indicates that the first virtual tile is associated with the first physical tile, and store the second compressed data in the first physical tile.

10. The system of claim 1, wherein the cache memory is further configured to, prior to receiving the first memory access request, store the second compressed data by:
    receiving a second memory access request from the processor to write the second compressed data to a second physical address within the another memory, wherein the second physical address is associated with a first virtual tile;
    in response, select the first group of blocks based on the second physical address;
    determine that a second storage state associated with the first group of blocks indicates that the first virtual tile is associated with a second physical tile included in the first group of blocks and the second physical tile already stores first non-compressed data; and
    store the second compressed data in the first physical tile.

11. A computer-implemented method for processing memory accesses associated with compressed data, the method comprising:
    receiving a first memory access request from a processor to write first compressed data to a first physical address within a memory;
    in response, selecting a first group of blocks within the memory based on the first physical address;
    determining that a first storage state associated with the first group of blocks indicates that a first physical tile included in the first group of blocks already stores second compressed data;
    in response, storing the first compressed data adjacent to the second compressed data in the first physical tile; and
    after storing the first compressed data adjacent to the second compressed data in the first physical tile, reading the first compressed data and the second compressed data from the another memory via a single read operation.

12. The computer-implemented method of claim 11, wherein storing the first compressed data adjacent to the second compressed data comprises:
    updating the first storage state to create a second storage state associated with the first group of blocks that specifies that the first compressed data and the second compressed data are stored in the first physical tile; and
    writing the first compressed data to the memory based on the second storage state.

13. The computer-implemented method of claim 12, further comprising:
    receiving a second memory access request from the processor to read data from the first physical address;
    in response, selecting the first group of blocks based on the first physical address; and
    reading the first compressed data from the first group of blocks based on the second storage state.

14. The computer-implemented method of claim 11, wherein the first storage state is specified by one or more compression bits.

15. The computer-implemented method of claim 14, wherein a first virtual tile is associated with the first physical address, and the one or more compression bits include a flip bit that indicates whether the first virtual tile is associated with the first physical tile or a second physical tile, and one or more format bits specify a data format associated with the first virtual tile and a data format associated with a second virtual tile.

16. The computer-implemented method of claim 11, further comprising, after reading the first compressed data and the second compressed data from the memory via the single read operation, storing the first compressed data and the second compressed data in a first cache line.

17. The computer-implemented method of claim 11, wherein a memory bandwidth between a cache memory and the memory comprises sixty-four bytes, the first compressed data comprises a block of thirty-two byes, the second compressed data comprises a block of thirty-two bytes, and further comprising:
    reading the first compressed data and the second compressed data from the memory as a contiguous block of sixty-four bytes, and
    storing the contiguous sixty-four bytes in a first cache line included in the cache memory.

18. The computer-implemented method of claim 11, wherein a first virtual tile is associated with the first physical address, and the one or more compression bits include a flip bit that indicates whether a second virtual tile is associated with the first physical tile or a second physical tile, and one or more format bits specify a data format associated with the first virtual tile and a data format associated with the second virtual tile.

19. The computer-implemented method of claim 18, wherein determining that the first storage state indicates that the first physical tile already stores second compressed data comprises:
    performing a comparison operation on the flip bit to determine that the second virtual tile is associated with the first physical tile; and
    performing one or more comparison operations on the one or more format bits to determine that the data format associated with the second virtual tile is a compressed data format.

20. A computing device configured to process memory accesses associated with compressed data, the computing device comprising:
- an attached memory; and
- a processing subsystem, comprising:
  - a processor; and
  - a cache memory coupled to the processor and configured to:
    - receive a first memory access request from the processor to write first compressed data to a first physical address within the attached memory;
    - in response, select a first group of blocks within the attached memory based on the first physical address; and
    - if a first storage state associated with the first group of blocks indicates that a first physical tile included in the first group of blocks already stores second compressed data, then:
      - store the first compressed data adjacent to the second compressed data in the first physical tile; and
      - after storing the first compressed data adjacent to the second compressed data in the first physical tile, read the first compressed data and the second compressed data from the another memory via a single read operation; or
    - in response, store the first compressed data in a second physical tile included in the first group of blocks.

\* \* \* \* \*

UNITED STATES PATENT AND TRADEMARK OFFICE
CERTIFICATE OF CORRECTION

PATENT NO. : 10,402,323 B2
APPLICATION NO. : 14/925920
DATED : September 3, 2019
INVENTOR(S) : Praveen Krishnamurthy et al.

Page 1 of 1

It is certified that error appears in the above-identified patent and that said Letters Patent is hereby corrected as shown below:

On the Title Page

(72) Inventors:
Please delete "Peter B. Holmquist" and insert --Peter B. Holmqvist--;
Please delete "Timothy Purcell" and insert --Timothy J. Purcell--.

Signed and Sealed this
Fourteenth Day of April, 2020

Andrei Iancu
*Director of the United States Patent and Trademark Office*